US009579869B2

(12) United States Patent
Qin et al.

(10) Patent No.: US 9,579,869 B2
(45) Date of Patent: Feb. 28, 2017

(54) LIQUID MOISTURE CURABLE POLYURETHANE ADHESIVES FOR LAMINATION AND ASSEMBLY

(75) Inventors: Shuhui Qin, Bartlett, IL (US); Yingjie Li, Batavia (IL)

(73) Assignee: Henkel IP & Holding GmbH, Duesseldorf (DE)

( * ) Notice: Subject to any disclaimer, the term of this patent is extended or adjusted under 35 U.S.C. 154(b) by 1055 days.

(21) Appl. No.: 12/371,939

(22) Filed: Feb. 17, 2009

(65) Prior Publication Data

US 2010/0209713 A1    Aug. 19, 2010

(51) Int. Cl.
| | |
|---|---|
| *C08G 18/00* | (2006.01) |
| *C08G 18/48* | (2006.01) |
| *C08G 18/72* | (2006.01) |
| *C09J 175/04* | (2006.01) |
| *B32B 7/12* | (2006.01) |
| *C08G 18/12* | (2006.01) |
| *C08G 18/76* | (2006.01) |
| *B32B 7/02* | (2006.01) |
| *B32B 27/06* | (2006.01) |
| *B32B 27/08* | (2006.01) |
| *B32B 27/12* | (2006.01) |
| *B32B 27/18* | (2006.01) |
| *B32B 27/20* | (2006.01) |
| *B32B 27/22* | (2006.01) |
| *B32B 27/28* | (2006.01) |
| *B32B 27/40* | (2006.01) |
| *C08K 5/01* | (2006.01) |

(52) U.S. Cl.
CPC .................. *B32B 7/12* (2013.01); *B32B 7/02* (2013.01); *B32B 27/06* (2013.01); *B32B 27/08* (2013.01); *B32B 27/12* (2013.01); *B32B 27/18* (2013.01); *B32B 27/20* (2013.01); *B32B 27/22* (2013.01); *B32B 27/285* (2013.01); *B32B 27/40* (2013.01); *C08G 18/12* (2013.01); *C08G 18/4808* (2013.01); *C08G 18/4866* (2013.01); *C08G 18/7664* (2013.01); *C09J 175/04* (2013.01); *B32B 2270/00* (2013.01); *B32B 2307/50* (2013.01); *B32B 2405/00* (2013.01); *C08K 5/01* (2013.01); *Y10T 428/31551* (2015.04)

(58) Field of Classification Search
CPC ........ C09J 175/04; C08G 18/00; C08G 18/10; C08G 18/48; C08G 18/72

USPC ....... 428/35.1–423.1, 35.7; 156/331.4, 331.7
See application file for complete search history.

(56) References Cited

U.S. PATENT DOCUMENTS

| | | | | |
|---|---|---|---|---|
| 4,231,986 | A * | 11/1980 | Brauer et al. | 264/272.11 |
| 5,332,786 | A * | 7/1994 | Nagata et al. | 525/130 |
| 5,486,570 | A | 1/1996 | St. Clair | |
| 5,786,085 | A | 7/1998 | Tzeng et al. | |
| 5,932,646 | A | 8/1999 | Roberts | |
| 5,968,995 | A * | 10/1999 | Rizk et al. | 521/159 |
| 6,004,641 | A * | 12/1999 | Tettamble | 428/36.5 |
| 6,077,925 | A * | 6/2000 | Gerard | 528/60 |
| 6,136,136 | A | 10/2000 | Heider | |
| 6,221,978 | B1 | 4/2001 | Li et al. | |
| 6,303,731 | B1 * | 10/2001 | Carlson et al. | 528/59 |
| 6,355,317 | B1 * | 3/2002 | Reid et al. | 428/34 |
| 6,635,722 | B2 | 10/2003 | Li et al. | |
| 8,101,681 | B2 * | 1/2012 | Kohl et al. | 524/506 |
| 2002/0182350 | A1 * | 12/2002 | Schmidt et al. | 428/35.7 |
| 2003/0176617 | A1 * | 9/2003 | Shen | 528/44 |
| 2004/0116644 | A1 * | 6/2004 | Okuhira et al. | 528/48 |
| 2004/0132953 | A1 * | 7/2004 | Fieldhouse et al. | 528/48 |
| 2007/0270567 | A1 | 11/2007 | Suen | |
| 2008/0182925 | A1 * | 7/2008 | Wang et al. | 524/66 |
| 2008/0185098 | A1 * | 8/2008 | Wu et al. | 156/331.4 |
| 2008/0280145 | A1 | 11/2008 | Paschkowski et al. | |
| 2009/0081468 | A1 * | 3/2009 | Mortensen | 428/423.3 |
| 2009/0306283 | A1 * | 12/2009 | Kohl et al. | 524/588 |

FOREIGN PATENT DOCUMENTS

| | | | | |
|---|---|---|---|---|
| WO | 9830648 | | 7/1998 | |
| WO | WO03/011947 A1 * | | 2/2003 | ............... C08J 3/00 |
| WO | WO 2005/097933 | | 10/2005 | |
| WO | WO 2009/011177 | | 1/2009 | |
| WO | WO01/23478 A * | | 5/2011 | ............. C08L 75/04 |

OTHER PUBLICATIONS

Wohler, J. Am. Chem. Soc., vol. 49, p. 3181 (1927).
International Search Report in connection with International Application No. PCT/US2010/024027 mailed Sep. 30, 2010.

* cited by examiner

*Primary Examiner* — Tri V Nguyen
(74) *Attorney, Agent, or Firm* — James E. Piotrowski

(57) ABSTRACT

This invention relates to polyurethane prepolymer containing adhesives that are liquid at room temperature and that do not phase separate under typical storage and use conditions and that can be cured by exposure to moisture or active hydrogen-containing curing agents. The polyurethane prepolymer adhesives exhibit surprisingly good adhesion to plastics such as fiberglass reinforced plastics ("FRP").

18 Claims, No Drawings

LIQUID MOISTURE CURABLE POLYURETHANE ADHESIVES FOR LAMINATION AND ASSEMBLY

BACKGROUND OF THE INVENTION

Field of the Invention

This invention relates to polyurethane prepolymer containing adhesives that are liquid at room temperature and that do not phase separate under typical storage and use conditions and that can be cured by exposure to moisture or active hydrogen-containing curing agents. The polyurethane prepolymer adhesives exhibit surprisingly good adhesion to plastics such as fiberglass reinforced plastics ("FRP").

Brief Description of Related Technology

Liquid moisture curable polyurethane adhesives are known. Indeed, Henkel Corporation presently sells and offers for sale liquid moisture curable polyurethane adhesive products under the tradenames Macroplast® UR and Macroplast® SIA, each of which has been met with considerable market success.

Liquid moisture curable polyurethane adhesive can be modified by some additives. For example, plasticizer oils have been used in the past to improve the rheology of such polyurethane adhesive. Adhesion promoters have also been used in the past to improve the adhesion to substrates of such polyurethane adhesive. However, in some instances, use of the plasticizer oil leads to phase separation, which is undesirable.

In the context of hot melt adhesives, which change phase depending on the temperature to which they are exposed, moisture curable polyurethane based materials are known. For instance, Henkel Corporation has been responsible for advances in such technology as defined and claimed for instance in U.S. Pat. Nos. 6,136,136 (Heidler), 6,221,978 (Li), and 6,635,722 (Li).

U.S. Pat. No. 5,786,085 (Tzeng) is directed to and claims a ridge cap formed from an asphaltic foam material comprising (1) a layer of said asphaltic foam material having an upper surface and a lower surface; (2) a layer of granules embedded in said upper surface of said layer of asphaltic foam material, said granules forming a decorative and/or protective layer of said ridge cap; and (3) an elastomeric strip connected to said layer of asphaltic foam material along a central axis of said layer and covered with said granules, where said ridge cap is bendable along said central axis. In the '085 patent, the asphaltic foam is a polyurethane material, and additives such as plasticizers and viscosity reducers are noted as possible reactants U.S. Pat. No. 5,932,646 (Roberts) is directed to and claims a composition of matter for waterproofing a surface of a wall comprising from about 30 to about 55 parts by weight of a polymeric base, the polymer base including from about 20 to about 45 parts by weight of a hydrocarbon resin, and from about 55 to about 80 parts by weight of an elastomeric copolymer having units selected from styrene, isoprene, butadiene, ethylene, butylene and mixtures thereof where the hydrocarbon resin and the elastomeric copolymer total about 100 parts by weight; and from about 45 to about 70 parts by weight of a solvent system, where the solvent system includes a blend of petroleum distillates and heptane, where the heptane comprises n-heptane, and where the polymer base and the solvent system total about 100 parts by weight.

Although liquid moisture curable polyurethane adhesives have been in industrial usage for several decades, there stands room for improvement. For example, adhesion to plastics such as FRP can be sometimes difficult. Production of such an adhesive also requires high processing temperature, which translates into higher than desired energy costs. The stability of such an adhesive can also stand improvement. It would be desirable to have liquid moisture curable polyurethane adhesives, which can be produced at lower processing temperatures, have improved stability, and have improved adhesion to plastics such as FRP.

SUMMARY OF THE INVENTION

The present invention provides a polyurethane prepolymer adhesive composition comprising a reaction product obtained by reacting a stoichiometric excess of at least one polyfunctional isocyanate with at least one polyol; at least one liquid paraffinic oil; and at least one aromatic oil.

It has surprisingly been found that such a liquid moisture curable polyurethane oil can be made at a temperature of 170° F., with good stability (e.g., showing little to no phase separation or cloudiness), and with good adhesion to substrates such as FRP. Comparable liquid moisture curable polyurethane adhesives derived from the same polyisocyanate and polyol reactant system without both the liquid paraffinic oil and aromatic oil are either unstable or show poor adhesion to substrates such as FRP.

DETAILED DESCRIPTION OF THE INVENTION

Liquid moisture curable polyurethane can be made by reacting excess amount of polyisocyanate with polyol. During and after application, the unreacted isocyanate groups react with moisture on or in the substrates and in the atmosphere to form thermoset system. The bond made with such adhesives offers excellent resistance to chemical, solvent, heat, and low temperature. This class of adhesives has found far flung application opportunities in a wide range of industries.

The present invention provide a polyurethane prepolymer adhesive comprising a reaction product obtained by reacting a stoichiometric excess of at least one polyfunctional isocyanate with at least one polyol; at least one liquid paraffinc oil; and at least one aromatic oil.

The reactants used to synthesize the polyurethane prepolymer should be selected such that the resulting polyurethane prepolymer is liquid at room temperature. The polyurethane prepolymer may be substantially linear in structure, with little to no branching. The polyurethane prepolymer is terminated with NCO (isocyanate) groups and typically has an isocyanate content of from about 1 to about 20 weight percent or from about 5 to about 15 weight percent. The viscosity of the polyurethane prepolymer typically is from about 1000 to about 25,000 centipoise at 25° C.

The polyols are generally polyether polyols such as polyethylene glycol, polypropylene glycol, polyethylene end-capped polypropylene glycol, polytetramethylene glycol, and the like, with a molecular weight from about 200 to about 10,000. The amount used can be from about 20 to 70, preferably from about 30 to 60, weight percent. Polyester polyols can also be used.

Suitable polyether polyols include oligomers and polymers containing a plurality of oxyalkylene repeating units such oxyethylene, oxypropylene, oxybutylene and/or oxytetramethylene and hydroxyl end groups. Desirably, difunctional polyether polyols (i.e., polyether polyols containing two hydroxyl groups per molecule) are employed. Illustrative polyether polyols are polyethylene glycols, polypropylene glycols, polytetramethylene glycols, polyethylene/propylene glycols (having a random, block or end-capped structure) and the like, with a number average molecular weight from about 200 to about 8000 or from about 400 to about 4000. Such polyether polyols can be prepared by ring-opening polymerization of cyclic oxygen-containing compounds such as ethylene oxide, propylene oxide, butylene oxide and tetrahydrofuran, often in the presence of an initiator such as a monomeric diol. The amount of polyether polyol used to prepare polyurethane prepolymers can be about 5 to 80, alternatively from about 30 to 50, weight percent of the total weight of the reactants. Mixtures of different polyether polyols having different chemical structures and/or different average molecular weights can be used.

The polyol should be present in an amount of from 20 to 70 weight percent.

The polyisocyanates generally used are any polyisocyanates with functionality equal to or above 2.0. One such example is a polyisocyanate commercially available under the trade name Rubinate® M from Huntsman Corporation or Mondur® MR from Bayer Corporation. The amount of the polyisocyanate typically ranges from 10 to 70, preferably from 20 to 60, weight percent of the composition.

Suitable isophthalic acid moiety-containing polyester polyols may be prepared by reacting isophthalic acid with one or more polyols (particularly diols). Other diacids, particularly aliphatic and cycloaliphatic dicarboxylic acids such as adipic acid, can also be used, in addition to isophthalic acid. Suitable aliphatic alcohols include, for example, ethylene glycol, propylene glycol, butane-1,4-diol, pentane-1,5-diol, hexane-1,6-diol, heptane-1,7-diol, octane-1,8-diol and higher homologs or isomers thereof which can be obtained by extending the hydrocarbon chain by one $CH_2$ group at a time or by introducing branches into the carbon chain. Other suitable diols include neopentyl glycol, diethylene glycol, polyethylene glycol, dipropylene glycol, polypropylene glycol, 1,4-cyclohexanediol, 1,4-cyclohexane dimethanol, bisphenol A and hydrogenated derivatives thereof, bisphenol F and hydrogenated derivatives thereof and the like. The total amount of polyester polyol typically ranges from 5 to 80, alternatively from 10 to 70, percent of the total weight of reactants used to prepare the liquid polyurethane prepolymer of this invention.

The polyisocyanate used to prepare the polyurethane prepolymer is an isocyanate or mixture of isocyanates having an average functionality (number of isocyanate functional groups per molecule) which is lower than 3.5, such as a difunctional isocyanate.

The polyisocyanate could be an aromatic diisocyanate such as pure 4,4'-diphenylmethane diisocyanate, commercially available under the trade name Rubinate® 44. Other suitable polyisocyanates include toluene diisocyanate, 1,4-diisocyanatobenzene (PPDI), 2,4'-diphenylmethane diisocyanate, 1,5-naphthalene diisocyanate, purified polymeric MDI (having an average functionality less than 3.5), bitolylene diisocyanate, 1,3-xylene diisocyanate, p-TMXDI, 1,6-diisocyanato-2,4,4-trimethylhexane, CHDI, BDI, $H_6$XDI, IPDI, $H_{12}$MDI, and the like. Mixtures of different polyisocyanates may be used, provided the average functionality of such mixture is less than 3.5. The amount of the polyisocyanate typically ranges from 10 to 60, alternatively from 20 to 50, percent of the total weight of reactants used to prepare the liquid polyurethane prepolymers of this invention. Such amount should be selected such that there is a stoichiometric excess of NCO (isocyanate) groups in the reactant mixture used to prepare the polyurethane prepolymer as compared to the number of functional groups capable of reacting with the NCO groups (e.g., the hydroxyl groups present in the polyester polyol and polyether polyol components reacted with the polyisocyanate component). For example, the NCO:OH ratio can be greater than 1.1:1 or greater than 1.2:1 or even higher, with the ratio being selected so as to control the NCO content and average molecular weight attained in the polyurethane prepolymer thereby obtained as may be desired.

Liquid paraffinic oils suitable for use herein include n-paraffinic oils, iso-paraffinic oils and other branched paraffins, cycloparaffins (naphthenes), condensed cycloparaffins (including steranes and hopanes), and others with alkyl side chains on ring systems. The paraffinic oil may be a 100% n-alkanes based paraffinic oil, with a molecular formula $CH_3[CH_2]_nCH_3$. This paraffinic oil is also called liquid paraffin, white mineral oil or liquid petrolatum. Commercially available examples of the paraffinic oil includes those under the trade name Citation™ NF grade from Avatar Corporation. The amount of the paraffinic oil typically ranges from 0.1 to 15, such as from 0.5 to 10, and desirably from 2 to 5, weight percent of the composition.

Aromatic oils suitable for use herein include oils which contain at least one ring that has a conjugated pi-electron system with (4n+2)pi electrons, where n is an integer such as 0, 1, or 2. Such aromatic oils include those aromatic hydrocarbons containing benzene systems, condensed aromatic systems, condensed aromatic cycloalkyl systems, and others with alkyl side chains on ring systems. An example of an aromatic oil useful herein is a complex mixture of 100% aromatic hydrocarbons, commercially available under the trade name Viplex®, and Vycel® from Crowley Chemical Company, and Shellflex® from Shell Company. The amount of the aromatic oil typically ranges from 0.2 to 15, such as 0.5 to 10, and most desirably from 1 to 6, weight percent of the composition. More information generally about liquid paraffinic oils and aromatic oils can be found in "The Chemistry and Technology of Petroleum, $4^{th}$ Edition" by James Speight, CRC Press, the disclosure of which is expressly incorporated herein by reference.

The ratio of liquid paraffinic oil to aromatic oil should be 3:1 to 1:3, such as 2:1 to 1:2, desirably 1:1.

The liquid moisture curable polyurethane adhesive of this invention, if desired, may also include additives such as catalysts, plasticizer oils, colorants, fillers, UV dyes, rheology modifiers (e.g., thickeners), foam-controlling agents, foaming (blowing) agents, dehydrating agents, coupling agents, adhesion promoting agents, other types of polyurethane prepolymers, additional polyisocyanate and other non-reactive or reactive additives, and any other additives known to one skilled in the liquid polyurethane adhesive field. Desirably, the liquid moisture curable polyurethane adhesive does not contain any significant amount of added solvent, i.e., any inert organic compound having a boiling point less than 200° C. at atmospheric (normal) pressure. By "significant amount" in this context the adhesive contains less than 1 weight %, such as less than 0.5 weight %, and desirably less than 0.1 weight % solvent.

The liquid polyurethane prepolymer may be cured by combining and reacting the prepolymer with one or more active hydrogen-containing curing agents. The adhesive may thus be formulated as a two component (2K) system, where a first component is comprised of the prepolymer and the second component is comprised of the curing agent with the components being stored separately but then combined shortly before utilizing the mixture as an adhesive. The curing agents may be selected so as to be reactive with the prepolymer even at ambient or room temperature, with curing beginning to take place as soon as the components are mixed together. However, the curing agent may be latent, i.e., essentially non-reactive with the prepolymer at room temperature but activatable by heating the adhesive mixture to an elevated temperature. The use of a latent curing agent permits the formulation of a storage-stable adhesive that can be cured by heating.

The term "active hydrogen-containing curing agent" as used herein includes any organic compound having at least two active hydrogens per molecule capable of reacting with the isocyanate groups present in the polyurethane prepolymer. For the purposes of this invention, "active hydrogen" refers to a hydrogen atom which, because of its position in the molecule, displays significant activity according to the Zerewitnoff test described by Wohler, *J. Am. Chem. Soc.*, Vol. 49, p. 3181 (1927). Illustrative of active hydrogen-containing moieties are —COOH (carboxylic acid), —OH (hydroxyl), —$NH_2$ (primary amino), —NH— (secondary amino), —$CONH_2$ (amido), —SH (thiol), and —CONH— (amido). Preferable active hydrogen-containing compounds include polyols, polyamines, polymercaptans and polyacids, which may be monomeric, oligomeric and/or polymeric in character. For example, polyether polyols, polyester polyols, as well as polyetherester polyols may be utilized. Examples of amino-group containing curing agents include both aromatic and aliphatic diamines, primary and secondary amine terminated polyether polyols, and difunctional, trifunctional, and polymeric amines. The type and amount of active hydrogen-containing curing agent combined with the polyurethane prepolymer may be selected and varied as needed to achieve the desired characteristics and properties in the cured adhesive. For example, the stoichiometric ratio of active hydrogen groups to isocyanate groups may be within the range of from about 0.5:1 to about 1.5:1.

In one embodiment of the invention, partial curing of the polyurethane prepolymer is accomplished through reaction with one or more active hydrogen-containing curing agents, with further curing being attained by reaction of the remaining isocyanate groups with moisture.

The inventive liquid moisture curable polyurethane adhesive should have a viscosity from 1,000 cps to 25,000 cps, such as 1,000 cps to 10,000 cps, and desirably 2,000 cps to 8,000 cps.

As the polyurethane prepolymer contains reactive isocyanate groups, maintaining the prepolymer in an environment protected from moisture during storage is desirable by storage, for example, in a sealed, dry and moisture-proof container until it is ready to be dispensed and applied to a substrate surface is one way to accomplish this objective.

The liquid moisture curable polyurethane adhesive may be applied to substrate surfaces using known application techniques, including but not limited to brushing, roller coating, extrusion and spraying. The substrate surface may be coated with the adhesive so as to form a continuous or discontinuous layer of adhesive on the substrate surface, the thickness of such layer being controlled as may be desired based on the target properties of the final assembly containing the cured adhesive. Typically, the adhesive layer is from about 0.01 to about 0.5 mm thick. Following application of such adhesive layer, a surface of a second substrate may be brought into contact with the adhesive layer (such contacting being preferably enhanced by application of pressure) so as to form an assembly of a first substrate and a second substrate with the adhesive layer therebetween.

Curing of the liquid moisture curable polyurethane adhesive may be carried out using various conditions. In particular, curing (involving reaction of the free NCO groups in the polyurethane prepolymer) can be achieved through exposure to moisture from the atmosphere and/or in or from the substrate surfaces. To accelerate the curing process, additional moisture may be introduced to the substrate surfaces prior to application of the adhesive and/or the assembly may be exposed to atmospheric humidity levels greater than would normally exist (by placing the assembly in a humidity chamber, for example) and/or the assembly may be heated at a temperature higher than room temperature and/or the adhesive may be formulated with one or more catalysts capable of increasing the reaction rate of water and the isocyanate groups. Similarly, where an active hydrogen-containing curing agent is employed, curing of the adhesive can be accelerated through heating and/or the use of catalysts.

The invention is further illustrated by the following examples.

Examples

Materials

Acclaim Polyol 2000 (Mn 2000) and Acclaim Polyol 4200 (Mn 4000), available from Bayer, are the polypropylene glycols used in the examples with a weight mixing ratio of 3.2:1.

Mondur® MR, available from Bayer, is Polymeric MDI with NCO % about 31% and functionality of 2.7.

Citation oil 70 NY, available from Avatar Corporation, is a 100% n-alkanes based mineral oil.

Viplex® 525, available from Crowley Chemical Company, is a 100% aromatic oil.

Preparation:

All the polyurethane adhesives in the following examples were prepared using the method described below with only the relative amounts and specific types of reactants changed for each example. All the reactants and oils are added to a mixer and heated to 170° F. with stirring. The mixture is reacted at 170° F. for a desired time, then cooled down and drawn off.

Tests:

A 5 q of the example is applied to a 0.5 foot by 1.0 foot strip of lauan substrate. After spray about 0.5 g of water mist, another 0.5 foot by 1 foot FRP strip is laminated on top of the coated strip to overlap each other. The laminated substrate is stored at room temperature for at least 12 hours before testing. The sample is then tested to determine the bonding strength by delamination of the bonded substrates.

Table 1 lists all the examples with different formulations. Bonding strength of Examples 1 to 4 were tested by using the method described as above. The bonding strength is rated as good if the bonded part can only be separated with 100% substrate failure, as fair if the bonded part can be separated with both substrate failure and adhesive failure (adhesive peeling off the FRP substrate), and as poor if the bonded part can be separated with significant adhesive failure.

TABLE 1

| Constituent | Compositions/ (Parts by weight) | | | |
| --- | --- | --- | --- | --- |
| | 1 | 2 | 3 | 4 |
| polyether polyol | 45 | 45 | 45 | 45 |
| polyMDI | 49 | 49 | 49 | 49 |
| Citation oil 70NF | — | — | 3 | 3 |
| Viplex 525 | — | 3 | — | 3 |

TABLE 2

| Physical Properties | Composition | | | |
|---|---|---|---|---|
| | 1 | 2 | 3 | 4 |
| Stability | Stable, Clear | Stable, Clear | Cloudy | Stable, Clear |
| Bond to FRP | Poor to Fair | Poor | — | Good |

The data shown in Table 2 demonstrate the following surprising results. Without the oil additives, the adhesive has good stability, but does not have good adhesion to FRP. Aromatic oil additive alone helps the stability of the adhesive but not the adhesion to FRP. Aliphatic mineral oil as an additive alone does not generate a stable prepolymer system. The combination of both the aromatic oil and aliphatic mineral oil additives generates a stable prepolymer system, which shows good adhesion to FRP as well.

What is claimed is:

1. A liquid polyurethane prepolymer adhesive composition comprising a reaction product obtained by reacting a stoichiometric excess of polymeric MDI with polyether polyol; at least one liquid paraffinic oil; and at least one aromatic oil different from the paraffinic oil, wherein the liquid paraffinic oil and the aromatic oil are present in a by weight ratio of 2:1 to 1:2, and wherein the polyurethane prepolymer adhesive is moisture curable, and in liquid form at 25° C. and free of solvent.

2. A liquid polyurethane prepolymer adhesive of claim 1 wherein the polymeric MDI is present in an amount from 10 to 70% by weight.

3. A liquid polyurethane prepolymer adhesive of claim 1 wherein the polyether polyol is present in an amount from 20 to 70% by weight.

4. A liquid polyurethane prepolymer adhesive of claim 1 wherein the liquid paraffinic oil is a mineral oil.

5. A liquid polyurethane prepolymer adhesive of claim 1 wherein the liquid paraffinic oil is present in an amount from 0.2 to 10% by weight.

6. A liquid polyurethane prepolymer adhesive of claim 1 wherein the liquid paraffinic oil is present in an amount from 1 to 8% by weight.

7. A liquid polyurethane prepolymer adhesive of claim 1 wherein the aromatic oil is present in an amount from 0.2 to 15% by weight.

8. A liquid polyurethane prepolymer adhesive of claim 1 wherein the liquid paraffinic oil has the general molecular formula of $CH_3[CH_2]_nCH_3$, wherein n=15 to 50% by weight.

9. A liquid polyurethane prepolymer adhesive of claim 1 wherein the polyether polyol is polypropylene glycol.

10. A liquid polyurethane prepolymer adhesive of claim 1 having a viscosity from 1000 cps to 25,000 cps.

11. A liquid polyurethane prepolymer of claim 1, wherein the liquid paraffinic oil and the aromatic oil are present in a weight ratio of about 1:1.

12. The polyurethane adhesive composition of claim 1 wherein the aromatic oil is 100% aromatic hydrocarbons.

13. An assembly comprising a first substrate, a second substrate, and a liquid moisture curable polyurethane adhesive of claim 1 between said first substrate and said second substrate.

14. The assembly of claim 13, wherein at least one of said first substrate or said second substrate is a low surface energy substrate.

15. An article comprising cured reaction products of the adhesive composition of claim 1 disposed thereon.

16. Cured reaction products of the adhesive composition of claim 1.

17. A liquid, moisture curable adhesive composition including a polyurethane prepolymer, the prepolymer comprising a reaction product obtained by reacting 10 to 60% by weight of composition of polymeric MDI with 20 to 70% by weight of composition of polyether polyol, wherein there is a stoichiometric excess of NCO groups; 0.2 to 10% by weight of composition of at least one liquid paraffinic oil; and 0.2 to 15% by weight of composition of at least one aromatic oil different from the paraffinic oil, wherein the liquid paraffinic oil and the aromatic oil are present in a weight ratio of 2:1 to 1:2, and wherein the polyurethane prepolymer adhesive is in liquid form at 25° C. and free of solvent.

18. A liquid, moisture curable polyurethane prepolymer, the prepolymer comprising a reaction product obtained by reacting only 10 to 60% by weight of composition of polymeric MDI with 20 to 70% by weight of composition of polyether polyol, wherein there is a stoichiometric excess of NCO groups; 0.2 to 10% by weight of composition of at least one liquid paraffinic oil; and 0.2 to 15% by weight of composition of at least one aromatic oil different from the paraffinic oil, wherein the liquid paraffinic oil and the aromatic oil are present in a weight ratio of 2:1 to 1:2, and wherein the polyurethane prepolymer adhesive is in liquid form at 25° C. and free of solvent.

* * * * *

UNITED STATES PATENT AND TRADEMARK OFFICE
CERTIFICATE OF CORRECTION

PATENT NO.         : 9,579,869 B2
APPLICATION NO.    : 12/371939
DATED              : February 28, 2017
INVENTOR(S)        : Shuhui Qin and Yingjie Li It is certified that error appears in the above-identified patent and that said Letters Patent is hereby corrected as shown below:

In the Specification

Column 6, Line 41: Change "5 q" to -- 5 g --.

Signed and Sealed this
Seventh Day of August, 2018

Andrei Iancu
*Director of the United States Patent and Trademark Office*